Jan. 12, 1965  J. ISREELI ETAL  3,165,692
CONTINUOUSLY OPERABLE APPARATUS AND METHOD FOR COUNTING
PARTICLES IN SUCCESSIVE PORTIONS OF
A FLOWING FLUID STREAM
Filed May 15, 1961  2 Sheets-Sheet 1
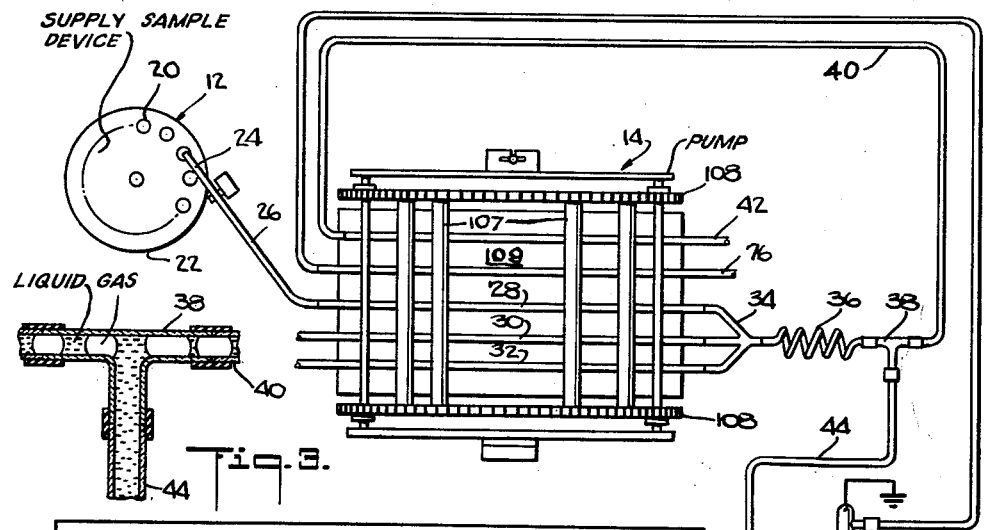
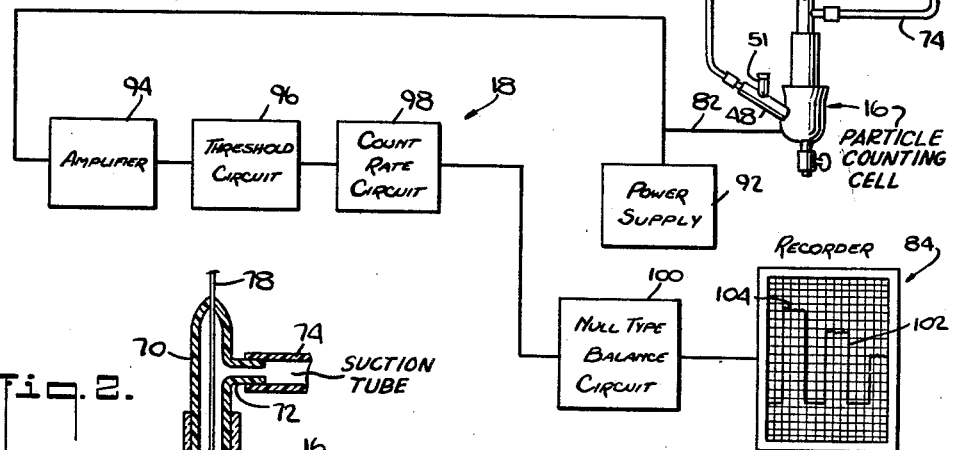
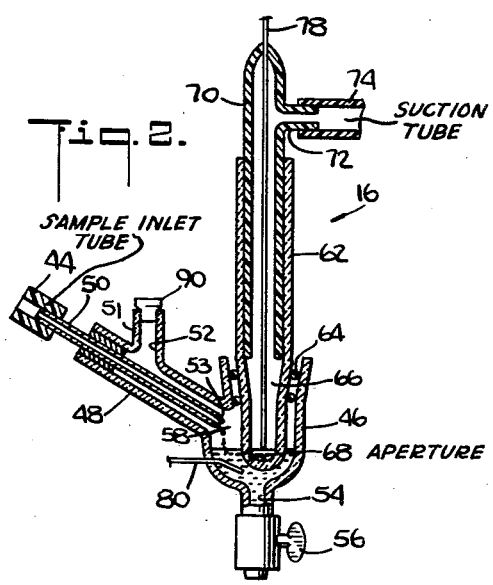
INVENTORS
JACK ISREELI
THEODORE BILICHNIANSKY
BY
ATTORNEY

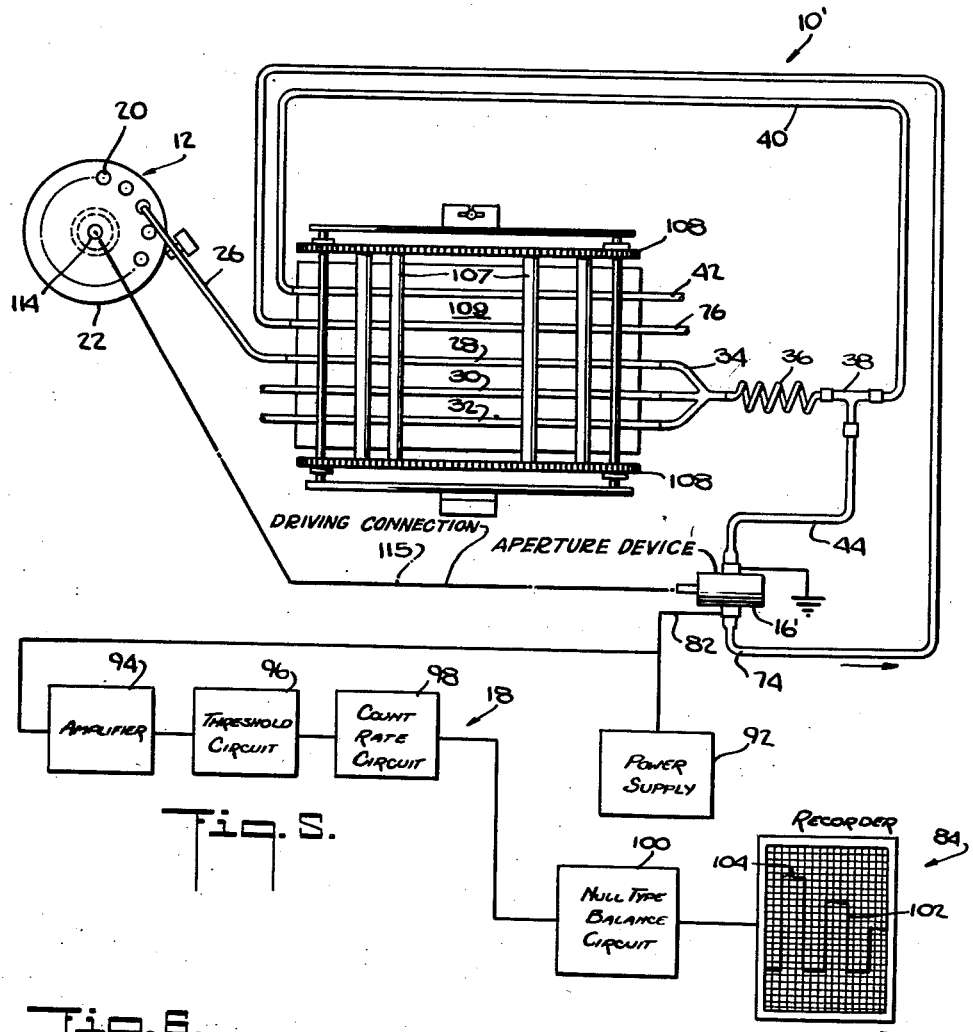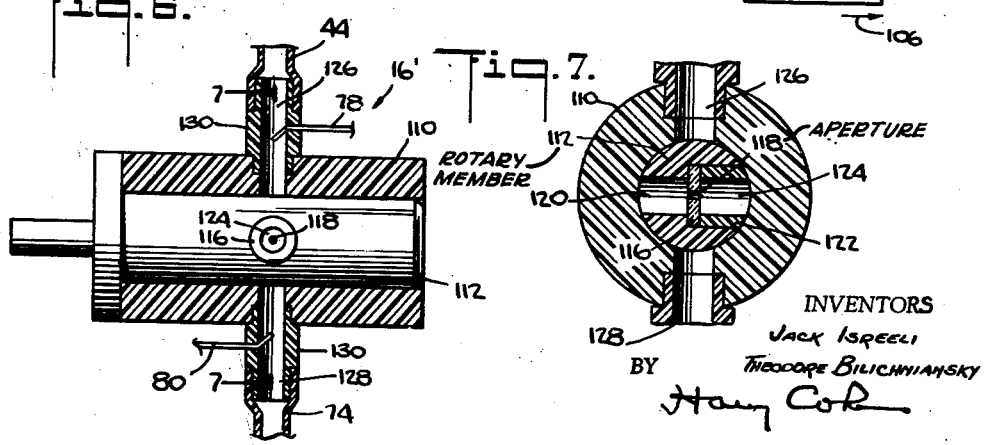

United States Patent Office 3,165,692
Patented Jan. 12, 1965

3,165,692
CONTINUOUSLY OPERABLE APPARATUS AND METHOD FOR COUNTING PARTICLES IN SUCCESSIVE PORTIONS OF A FLOWING FLUID STREAM
Jack Isreeli, Tuckahoe, and Theodore Bilichniansky, Pleasant Valley, N.Y., assignors to Technicon Instruments Corporation, Chauncey, N.Y., a corporation of New York
Filed May 15, 1961, Ser. No. 116,907
13 Claims. (Cl. 324—71)

This invention relates to means for determining the number of particles suspended in a liquid medium and, more particularly, to a method and apparatus for making such determinations continuously.

Heretofore particle counters, whose operation was based on the electrical conductivity difference between the particles and the liquid medium in which they were suspended, effected a particle count by causing a mercury siphon to displace a small predetermined volume of the suspension from a large beaker and measuring the number of particles in the displaced suspension. Due to the necessity of providing separate beakers of liquid, the count determinations could not be accomplished in a continuous fashion and the counts were determined in batch fashion wherein individual beakers of the liquid were intermittently supplied to the counter manually for the count determinations.

The primary object of the present invention is to provide a method and apparatus for continuously determining the number of particles suspended in a liquid medium.

Another object is to provide an apparatus of the above-indicated type, whose operation is based on the electrical conductivity difference between the particles and the liquid suspension medium, with means which prevents or substantially reduces clogging of the constricted flow path for the liquid.

A further object is the provision of a cell which is especially well adapted for use in automatic and continuous particle counters.

The above and other objects, features and advantages of this invention will be more fully understood from the following description of the presently preferred embodiment of the invention considered in connection with the accompanying illustrative drawings.

In the drawings:

FIG. 1 is a more or less diagrammatic view illustrating a method and an apparatus according to the invention;

FIG. 2 is a vertical sectional view, on a larger scale, of the cell of FIG. 1;

FIG. 3 is a detail sectional view, on a larger scale, illustrating a T-connection of the apparatus of FIG. 1;

FIG. 4 is a detail sectional view illustrating a modification;

FIG. 5 is a more or less diagrammatic view illustrating another embodiment of the invention;

FIG. 6 is a longitudinal sectional view, on a larger scale, of part of the apparatus shown in FIG. 5; and FIG. 7 is a sectional view, on a larger scale, taken on line 7—7 of FIG. 6.

Referring now to the drawings in detail and particularly to FIG. 1, the apparatus 10 comprises a sample supply device 12, a proportioning pump 14, a particle counter cell 16, and an electrical measuring circuit generally indicated by the reference numeral 18. The liquid samples whose particle contents are to be determined are provided in open top receptacles 20 which are arranged in a circular row on a rotary support plate 22 which is intermittently rotated to position the open top of each sample receptacle below the inlet end of an inlet aspirating tube 24. The inlet tube is pivoted into and out of each receptacle as it is moved into position by the rotation of the support plate 22 and a portion of the sample from each receptacle is aspirated from its respective receptacle by the action of pump 14 and flows as a stream through supply tube 26 and pump tube 28 where it joins a stream of an inert gas, for example air, which is supplied through pump tube 30, and a stream of a diluent, for example distilled water, which is supplied through pump tube 32. The separate streams join each other at fitting 34 and are mixed in the horizontal mixing helical coil 36 to form a segmented stream consisting of a series of liquid segments L consisting of sample liquid and diluent separated from each other by an intervening segment G of air, and this segmented stream is transmitted to the T-connection 38 by the action of the pump.

As seen in FIG. 3, the air segments G are separated from the segmented stream by aspiration via tube 40 and pump tube 42, respectively, and the sample diluted stream, in consolidated form, flows to the cell 16 via tube 44. The gas segments aid in keeping the internal walls of the various tubes of the apparatus clean and also subdivide each sample into a series of liquid segments which assists in the mixing of the sample with the diluent in the mixing coil 36. Moreover, since the intake tube 24 is removed from the receptacle 20 to permit the succeeding receptacle to be moved into aspirating position, the continuously operating pump 14 draws air into the inlet tube 26 so that each sample is separated from the other by an intervening segment of air and because of the continuous operation of the pump each sample is also separated from each other by an intervening segment of diluent.

Referring now to FIG. 2, the cell 16 is of tubular construction and comprises a lower cup portion 46 which is preferably made of glass and has an offset inlet arm 48 provided with an inlet tube 50 and an arm 51 provided with a plugged opening 52 which is used for filling and flushing the cup and to maintain the proper level of liquid in the cup. The lower part of the cup is provided with a drain opening 54 of sufficient size to permit any foreign matter to drain out of the cell 16, and a stop cock 56. The cup provides a first chamber 58 into which the liquid flows through the sample tube 50 and it will be observed that the outlet end 53 of the sample tube is shaped like the end of a dropper and positioned so that the flow of the incoming liquid drops into chamber 58 without effecting a continuous contact with the liquid already in chamber 58. Since the liquid is electrically conductive, this manner of introducing the liquid into the chamber of the cell minimizes electrical disturbance of the measuring circuit, for example because of possible induced currents in the conductive liquid. The air segments between samples also reduce the effects of induced currents.

Disposed in cup 46 is a vertical aspirating tube 62, preferably made of glass, whose lower end is disposed in chamber 58 and is held in sealed position in the cup by resilient sealing rings 64. The lower end of the aspirating tube forms a second chamber 66 and the lower wall of the aspirating tube which separates chambers 58 and 66 from each other is provided with an aperture 68. The aperture provides a constricted flow path for the liquid from the first chamber to the second chamber. Disposed in the upper part of the aspirating tube 62 is a relatively rigid tube 70, preferably made of polytetrafluoroethylene, which has a liquid outlet 72 which is connected to a suction tube 74 that is connected to pump tube 76. Tubes 62 and 70 can be made integral and of glass. Tube 74 is preferably made of a suitable plastic material and is preferably sufficiently stiff to resist collapse under the suction effect of pump tube 76. A grounded electrode 78 extends into aspirating tube 62 and its lower end is adjacent one side of aperture 68 in chamber 66. Another electrode 80 has one end disposed in the liquid in chamber 58 adjacent the other side of aperture 68 and the opposite end of the electrode is connected to the previously mentioned measuring circuit 18 by a lead wire 82.

As is well known to those skilled in the art and as explained in U.S. Patent No. 2,656,508, aperture 68 provides a constricted flow path for the liquid from chamber 58 to chamber 66. The conductivity of this flow path changes as an individual particle is carried with the liquid through the aperture because the particle displaces the liquid medium within the aperture and thereby changes the electrical resistance of the aperture contents. This produces a voltage pulse of short duration which has a magnitude proportional to the particle size and this voltage pulse is transmitted to the measuring circuit 18 via lead 82, and is utilized in operating a recorder 84 which records the number of particles in the sample. The size of the aperture is selected so that only particles of a given size range can pass through the aperture and in this manner the apparatus is able to select and count those particles only which constitute a particular constituent of the liquid, for example white or red corpuscles in whole blood. The diluent is added to the liquid in sufficient quantities to dilute the liquid and thereby reduce the probability of two or more particles passing simultaneously through the aperture 68, since it will be readily apparent that this would still result in a single voltage pulse even though two particles are present in the aperture. The conductivity of the diluent can be selected so that the resulting liquid has a conductivity which is different from the particles suspended therein.

Operation of pump 14 results in the flow of liquid from chamber 58 through aperture 68 into the second chamber 66, and from chamber 66 the liquid is transmitted from the cell through tube 74 and pump tube 76 to waste. The suction effect provided by the pump helps prevent any clogging which may otherwise occur in the relatively small aperture 68 especially in the case of relatively large particles. The suction prevents this clogging and aids in dislodging any particles which may be entrapped in aperture 68.

In FIG. 4 there is shown a device which may be employed to prevent clogging of aperture 68. A rotary eccentric cam 86 is positioned in operative relation to tube 74 and in the position shown engages said tube but does not collapse it. The lower side of the tube is supported on a stationary rigid plate 88. Cam 86 is continuously operated and during its operation compresses and releases tube 74 which causes a displacement of the liquid in tube 74. Since the volume displaced by the cam 86 is greater than the volume displaced by the pump 14, this causes an intermittent reverse flow of the liquid through aperture 68 in a direction toward chamber 58 of the cell. This pulsating back-flow of the liquid aids in preventing clogging of aperture 68 and dislodges any particles which may be entrapped in or at the entrance of the aperture. It will be understood that the motor operated cam 86 and plate 88 can be readily assembled in operative relation to tube 74 of the apparatus illustrated in FIG. 1.

To initially fill the cell 16 to the level indicated in FIG. 2, prior to operating the apparatus, the plug 90 which is inserted in opening 52 is removed, and stop cock 56 is closed. The apparatus is operated until the sample liquid reaches the level shown in FIG. 2, at which time plug 90 is inserted in opening 52 and stop cock 56 is opened so that the chamber 58 is vented to the atmosphere. Except for this opening, the system is otherwise closed and atmospheric pressure is applied to the liquid in chamber 58 through said opening. The rate of flow of incoming liquid into chamber 58 is somewhat more than the rate of flow of the outgoing liquid through chamber 66. However, the level of the liquid in chamber 68 remains substantially at the position shown above the aperture 68 because of atmospheric pressure applied to the closed system through opening 54 and only excess liquid drains out of said opening.

The power supply 92 of the measuring circuit comprises a high voltage direct current supply with a high resistance in series with the voltage source so that the current in the circuit is substantially constant. Accordingly, as the conductivity of the constricted flow path of the liquid changes due to the passage of a particle through the aperture 68, the voltage changes in proportion to the change in resistance of the flow path. This voltage pulse is amplified by the amplifier 94 and the amplified voltage is transmitted to a threshold circuit 96. The threshold circuit transmits only those voltage pulses which are above a predetermined magnitude corresponding to a particle of a particular size. The transmitted voltage pulses are received by count rate circuit 98 which provides a voltage which is proportional to the rate of flow of the particles through the aperture 68. Since this rate of flow is approximately proportional to the quantity of particles present in a predetermined volume, the voltage provided by a circuit 98 is a measurement of the number of particles in the sample. This voltage is applied to one side of a null type balancing circuit 100 and the difference in voltage between the measuring side of the circuit and the constant voltage side of the circuit is applied to the motor of the recorder 84 which operates a stylus to provide a recording 102 which is indicative of the number of particles in the sample. It will be noted that the recording consists of peaks 104 separated from each other in the direction of movement of the chart paper indicated by the arrow 106. Each peak represents the number of particles in a particular sample and the separation between peaks is due to the fact that the samples are separated from each other by a segment of diluent and during the passage of the diluent through the cell, no peaks occur. In this manner, each sample can easily be distinguished from the other on the chart paper of the recorder and a continuous recording of the number of particles in each sample is continuously provided.

It is within the scope of the invention to utilize the apparatus for continuously monitoring a continuous stream of liquid to determine the number of particles present in the stream. This can easily be accomplished by connecting the intake tube 26 to an offtake from the conduit in which the stream is flowing and continuously transmitting a portion of said stream through inlet tube 26. Of course, when the apparatus is used to monitor a stream, the sample supply device 12 is not used. The sample supply device 12 may be of the type shown by U.S. Patent No. 2,879,141 or by U.S. Patent No. 3,038,340.

The various circuits comprising the measuring means 18 have not been described in detail since they are well known circuits and their details do not, per se, form a part of this invention. The proportioning pump 14 is preferably one of the type shown in U.S. Patent No. 2,935,028. The pump comprises a series of pressure applying rollers 107 whose ends are connected to sprocket chains 108 which move the rollers longitudinally of the pump tubes. During such movement the pump tubes are compressed along their lengths by the rollers 107 against a platen 109 for the pumping operation.

Referring now to FIGS. 5, 6 and 7 of the drawings, the apparatus 10' is similar to the previously described apparatus 10 except that an aperture device 16' has been substituted for the cell 16. Device 16' comprises a housing 110, preferably made of polytetrafluoroethylene and a rotary member 112, preferably made of polytrifluorochloroethylene, which is mounted in fluid-tight relation in the housing and which is operatively connected to the rotary drive shaft 114 of the sample supply device 12, as indicated by the dot-dash line 115. The connection is such that when the support plate 22 of the supply device is rotated, member 112 is rotated one-half revolution for a purpose which will be more fully understood hereinafter. The materials of which the housing and rotary member are constructed are non-wettable so that no portions of the liquid which flow through the device 16' adhere to the surfaces of the device. This helps to reduce contamination of a sample by a preceding sample.

Member 112 is provided with an aperture member 116, in the form of a ring, which has a central aperture 118 that provides a constricted flow path for the liquid. The rotary member has a passage 120 at one side of the aperture and the aperture member is retained in member 112 by the press-fitted plug 122 which has a passage 124 at the other side of the aperture and the passages are in fluid flow communication with the aperture. Passages 120 and 124 and aperture 118 are positioned transversely of the longitudinal axis of said rotary member 112. The housing 110 of the aperture device has an inlet passage 126 and an outlet passage 128 and each passage is provided with a nipple 130 which supports one end of the electrode 78 or 80, as the case may be, in the path of flow of the liquid. Conduit 44 is connected to the nipple 130 for the inlet passage 126 and conduit 74 is connected to the nipple 130 for the outlet passage 128.

During the operation of the apparatus, member 112 of the device 16' is rotated periodically because of its operative connection with the drive shaft 114 of the sample supply device 12. In the position shown in FIGS. 6 and 7, the device 16' is closed but it will be understood that the rotary member 112 is positioned with respect to passages 126 and 128 in the housing so that passages 120 and 124 in the rotary member are in communication with the passages in the housing. Operation of the supply device causes the rotary member 112 to rotate periodically one-half revolution during indexing movement of the support plate 22 of the supply device so that the inlet and outlet ends of aperture 118 are reversed in their positions in respect to passages 126 and 128. By thus reversing the positions of the ends of the aperture, one or more particles which fail to clear through the inlet end of the aperture are dislodged from that end of the aperture when the aperture member is reversed by reason of the fact that said end becomes the outlet end of the aperture and the liquid flowing through that outlet end forces the particles away from the last mentioned end of the aperture.

If desired or required, a separate motor can be provided to rotate plug 112 of the valve in timed relation with the periodic rotation of the plate 22 of the sample supply device. It is also within the scope of this invention to operate the aperture device periodically by hand or by a motor independently of a timed relation to the operation of the sample supply device.

It will be understood that in this form of the invention a solid stream of liquid from which the air segments have been removed by separator 38 flows through tube 44 to the normally open device 16' and through the constricted aperture 118 of said device to tube 74 through which the liquid is aspirated by the pump. If desired air may be injected into tube 74 close to nipple 130 to form air segments between adjacent liquid segments to reduce or eliminate electrical disturbance due to induced current in the liquid flowing through said tube. It will be understood that tube 44 can be very short so that electrical disturbance due to induced current may be negligible or sufficiently small to be tolerated. In order to inject air into tube 74 the pump may be provided with an additional pump tube (not shown) and connected to tube 74 near nipple 130.

While the invention has wide application for industrial uses for the counting of minute particles distributed in various fluids, it is considered to have important clinical uses especially for counting blood cells in blood specimens whereby to eliminate the tedious methods which involve the counting of blood cells by a technician with the required aid of a microscope. Also, it will be understood that by reason of the fact that the invention provides for and makes possible the examination of a series of specimens or samples one after another flowing in a stream through the apparatus, the present apparatus and method greatly reduces the time required for making blood counts besides eliminating the tedious work referred to and eliminating or greatly reducing the chances of error.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying ideas or principles of this invention within the scope of the appended claims.

What is claimed is:

1. Apparatus for determining the number of particles suspended in a liquid having a different electrical conductivity than said particles, comprising a substantially enclosed cell having a liquid inlet and a liquid outlet and means providing a constricted flow path for the liquid between said inlet and outlet, pump means connected to said inlet for transmitting a continuous stream of the liquid to said cell, pump means for applying a suction to said outlet for causing the continuous flow of the liquid through said constricted flow path to said outlet, and means for measuring the electrical conductivity of said flow path during the flow of the liquid therethrough as a measurement of the number of particles in said liquid.

2. Apparatus for determining the number of particles suspended in a liquid having a different electrical conductivity than said particles, comprising a substantially enclosed cell having a liquid inlet and a liquid outlet and means providing a constricted flow path for the liquid between said inlet and outlet, conduit means connected to said inlet for transmitting a continuous stream of the liquid to said cell, other conduit means connected to said outlet for transmitting the liquid from the cell in the form of a continuous stream, means connected to said other conduit means for applying a suction thereto and thereby causing the flow of the liquid through said constricted flow path to said outlet, means operatively connected to said other conduit means for intermittently compressing said other conduit means and causing intermittent reverse flow of the liquid toward said inlet to dislodge any clogging material present in said constricted flow path, and means for measuring the electrical conductivity of said flow path during the flow of the liquid therethrough as a measurement of the number of particles in said liquid.

3. Apparatus for continuously determining the number of particles in a liquid having a different electrical conductivity than said particles, comprising a substantially enclosed cell having first and second chambers separated from each other by a wall having an aperture therein providing a constricted flow path for the liquid from said first chamber to said second chamber, said first chamber having a liquid inlet and said second chamber having a liquid outlet, means connected to said inlet for transmitting a continuous stream of the liquid to said cell, means for applying a suction to said outlet for causing the continuous flow of the liquid through said constricted flow path to said outlet, and means for measuring the electrical conductivity of said flow path during the flow of the liquid therethrough as a measurement of the number of particles in said liquid.

4. Apparatus for continuously determining the number of particles in a liquid having a different electrical conductivity than said particles, comprising a substantially enclosed cell having first and second chambers separated from each other by a wall having an aperture therein providing a constricted flow path for the liquid from said first chamber to said second chamber, said first chamber having a liquid inlet and said second chamber having a liquid outlet, means connected to said inlet for transmitting a continuous stream of the liquid to said cell, means for applying a suction to said outlet for causing the continuous flow of the liquid through said constricted flow path to said outlet, an electrode in said first chamber having an end thereof adjacent one side of said aperture and another electrode in said second chamber having an end thereof adjacent the other side of said aperture, and means associated with said electrodes for measuring the electrical conductivity of said flow path during the flow of the liquid therethrough as a measurement of the number of particles in said liquid.

5. Apparatus for continuously determining the number of particles in a liquid having a different electrical conductivity than said particles, comprising a substantially enclosed cell having first and second chambers separated from each other by a wall having an aperture therein providing a constricted flow path for the liquid from said first chamber to said second chamber, said first chamber having a liquid inlet and said second chamber having a liquid outlet, said first chamber having a vent and said second chamber being open only at said outlet, pump means connected to said inlet for transmitting a continuous stream of the liquid to said first chamber, pump means connected to said outlet for applying a suction to said second chamber for causing continuous flow of the liquid from said first chamber to said second chamber through said aperture, and means for measuring the electrical conductivity of said flow path during the flow of the liquid therethrough as a measurement of the number of particles in said liquid.

6. Apparatus for continuously determining the number of particles in a liquid having a different electrical conductivity than said particles, comprising a substantially enclosed cell having first and second chambers separated from each other by a wall having an aperture therein providing a constricted flow path for the liquid from said first chamber to said second chamber, said first chamber having a liquid inlet and said second chamber having a liquid outlet, said first chamber having a vent and said second chamber being open only at said outlet, pump means connected to said inlet for transmitting a continuous stream of the liquid to said first chamber, pump means connected to said outlet for applying a suction to said second chamber for causing continuous flow of the liquid from said first chamber to said second chamber through said aperture, an electrode in said first chamber having an end thereof adjacent one side of said aperture and another electrode in said second chamber having an end thereof adjacent the other side of said aperture, and means associated with said electrodes for measuring the electrical conductivity of said flow path during the flow of the liquid therethrough as a measurement of the number of particles in said liquid.

7. A method of continuously determining the number of particles suspended in a liquid having a different electrical conductivity than said particles, comprising continuously transmitting a stream of the liquid through a conduit having a constricted passage therein and electrodes at opposite sides, respectively, of said passage for sensing changes in conductivity of the liquid as it and a particle therein flows through said passage, and operating electrical counting means under the control of said sensing electrodes in response to changes in conductivity of the particles-containing liquid as it flows through said constricted passage.

8. A method of determining the number of particles in each of a series of liquid specimens wherein the particles have a different electrical conductivity than the liquid containing the particles, comprising transmitting the samples one after the other in a flowing stream in one direction in conduit means having an inlet and an outlet and a constricted passage between said inlet and outlet, and measuring the number of changes in electrical conductivity of each specimen, one after the other in succession, during the flow of said stream through said constricted passage.

9. Apparatus for determining the number of particles suspended in a liquid, the electrical conductivity of the particles being different from the electrical conductivity of the liquid, comprising conduit means for the flow of said liquid, an aperture device in said conduit means having a rotary member provided with an aperture therein defining a constricted flow for the liquid and electrodes at opposite sides, respectively, of said aperture for sensing changes in the conductivity of the liquid as it and a particle therein flows through said aperture, pump means for transmitting a continuous stream of said particles containing liquid through said conduit means, means operable under the control of said electrodes for measuring the conductivity changes in said liquid during the flow through said aperture, and means operatively connected to said member for periodically rotating said member so that the opposite ends of said aperture are periodically reversed in their positions in relation to the direction of flow of the liquid.

10. Apparatus for continuously determining the number of particles in a liquid having a different electrical conductivity than said particles, comprising a substantially enclosed cell having first and second chambers separated from each other by a wall having an aperture therein providing a constricted flow path for the liquid from said first chamber to said second chamber, said first chamber having a liquid inlet and said second chamber having a liquid outlet, means connected to said inlet for transmitting a stream of the liquid to said cell, means for applying a suction to said outlet for causing the flow of the liquid through said constricted flow path to said outlet, means for maintaining the liquid in said first chamber at a predetermined level above the aperture in said wall during the flow of the liquid through said constricted flow path, and means for measuring the electrical conductivity of the liquid flowing through said constricted flow path as a measurement of the number of particles in said liquid.

11. Apparatus for continuously determining the number of particles in a liquid having a different electrical conductivity than said particles, comprising a cell having first and second chambers separated from each other by a wall having an aperture therein providing a constricted flow path for the liquid from said first chamber to said second chamber, said first chamber having a liquid inlet and said second chamber having a liquid outlet, means connected to said inlet for transmitting a stream of the liquid to said cell, means for applying a suction to said outlet for causing the flow of the liquid through said constricted flow path to said outlet, means in flow communication with the aperture for maintaining the liquid in said first chamber at a predetermined level above said aperture in said wall during the flow of the liquid through said constricted flow path, and means for measuring the electrical conductivity of the liquid flowing through said constricted flow path as a measurement of the number of particles in said liquid.

12. Apparatus for determining the number of particles suspended in a liquid stream, said liquid stream having a different electrical conductivity than said particles and composed of a series of particle-containing liquid segments separated from each other by a series of other liquid segments which prevent different particle-containing liquids from mixing with each other; comprising conduit means for the flow of said liquid stream, said conduit means having a constricted passage therein and electrodes at opposite sides, respectively, of said passage for sensing changes in conductivity of the liquid as it and a particle therein flows through said passage, said conduit means having an inlet at one side of said constricted passage and an outlet at the opposite side of said constricted passage, pump means operatively connected to said inlet and to said outlet for effecting a continuous flow of the liquid stream in one direction into said conduit means, through said constricted passage and out of said conduit means, and means operable under the control of said electrodes for measuring the number of conductivity changes in said liquid during the flow through said restricted passage of said conduit means.

13. Apparatus for continuously determining the number of particles in a liquid having a different electrical conductivity than said particles, comprising a cell having first and second chambers separated from each other by a wall having an aperture therein providing a constricted flow path for the liquid from said first chamber to said second chamber, said first chamber having a liquid inlet and said second chamber having a liquid outlet, a sample supply device for a plurality of sample liquids, conduit means for transmitting to said cell a stream of sample liquids spaced from each other in the flow direction of the stream, means for introducing into said conduit a stream of diluent liquid during the flow of said sample liquids through said conduit for mixture with said sample liquids and also in the spaces between successive sample liquids, thereby forming a stream which flows through the conduit prior to its introduction into the cell comprised of a series of diluted sample liquids separated from each other by diluent liquid, thereby preventing the mixing of different sample liquids with each other, pump means connected to said outlet for applying a suction to said second chamber for causing the continuous flow of the liquid stream from said first chamber to said second chamber through said aperture, and means for measuring the electrical conductivity of said flow path during the flow of the liquid stream therethrough as a measurement of the number of particles in said liquid stream.

References Cited by the Examiner

UNITED STATES PATENTS

| | | | |
|---|---|---|---|
| 993,586 | 5/11 | Digby et al. | 324—30 |
| 2,181,866 | 12/39 | Cameron | 324—30 |
| 2,325,695 | 8/43 | McAfee | 73—219 |
| 2,414,411 | 1/47 | Marks | 324—30 |
| 2,621,012 | 12/52 | Graham | 251—207 |
| 2,709,781 | 5/55 | Douty et al. | 324—30 |
| 2,769,140 | 10/56 | Obenshain | 324—30 |
| 2,869,078 | 1/59 | Coulter et al. | 324—71.4 |
| 3,050,665 | 8/62 | Hurd | 340—13 |

FREDERICK M. STRADER, *Primary Examiner.*

WALTER L. CARLSON, *Examiner.*